United States Patent
Searle et al.

(10) Patent No.: US 6,950,856 B2
(45) Date of Patent: *Sep. 27, 2005

(54) LIBRARY FOR STORING DATA-STORAGE MEDIA AND HAVING A REMOVABLE INTERFACE MODULE

(75) Inventors: Nathan H. Searle, Snohomish, WA (US); Allen E. Fleckenstein, Bellevue, WA (US)

(73) Assignee: Advanced Digital Information Corporation, Redmond, WA (US)

( * ) Notice: Subject to any disclaimer, the term of this patent is extended or adjusted under 35 U.S.C. 154(b) by 147 days.

This patent is subject to a terminal disclaimer.

(21) Appl. No.: 10/273,375

(22) Filed: Oct. 16, 2002

(65) Prior Publication Data

US 2003/0097200 A1 May 22, 2003

Related U.S. Application Data

(63) Continuation of application No. 09/791,953, filed on Feb. 22, 2001, now Pat. No. 6,542,787, which is a continuation of application No. 09/062,522, filed on Apr. 17, 1998, now Pat. No. 6,266,574.

(51) Int. Cl.$^7$ ............................................. G06F 15/167
(52) U.S. Cl. ..................... 709/214; 700/214; 700/218; 700/220
(58) Field of Search ......................... 709/214; 700/214, 700/218, 220; 361/724, 725, 727, 728, 730

(56) References Cited

U.S. PATENT DOCUMENTS

| | | | |
|---|---|---|---|
| 3,809,263 A | 5/1974 | Dodd et al. | |
| 3,831,197 A | 8/1974 | Beach et al. | |
| 4,519,522 A | 5/1985 | McElwee | |
| 4,654,727 A | 3/1987 | Blum et al. | |
| 4,779,151 A | 10/1988 | Lind et al. | |
| 4,802,035 A | 1/1989 | Ohtsuka | |
| 4,816,943 A | 3/1989 | Tanaka et al. | |
| 4,817,070 A | 3/1989 | Hug et al. | |
| 4,864,511 A | 9/1989 | Moy et al. | |
| 4,945,429 A | 7/1990 | Munro et al. | |
| 4,984,106 A | * 1/1991 | Herger et al. | 360/92 |
| 5,016,127 A | 5/1991 | Inoue et al. | |
| 5,089,920 A | 2/1992 | Bryer et al. | |
| 5,157,564 A | 10/1992 | Theobald et al. | |
| 5,182,687 A | 1/1993 | Campbell et al. | |
| 5,211,459 A | 5/1993 | Wu | |
| 5,235,474 A | * 8/1993 | Searle | 360/71 |

(Continued)

FOREIGN PATENT DOCUMENTS

| | | |
|---|---|---|
| DE | 3612531 A1 | 11/1986 |
| EP | 0 186 945 A1 | 7/1986 |

(Continued)

Primary Examiner—Frantz B. Jean
(74) Attorney, Agent, or Firm—Perkins Coie LLP

(57) ABSTRACT

A library for storing a cartridge of data-storage media includes a removable module and a chassis having a module receptacle. Cartridge storage slots are disposed within the chassis, and a media drive is disposed within the removable module. A cartridge transporter is disposed within the chassis and transports the cartridge between one of the cartridge slots and the media drive when the module is inserted within the module receptacle. A library control circuit is disposed within the chassis and controls the cartridge transporter. An interface circuit is disposed within the removable module and electronically interfaces a host computer to the media drive, and, when the removable module is inserted within the module receptacle of the chassis, electronically interfaces the host computer to the library control circuit.

15 Claims, 12 Drawing Sheets

U.S. PATENT DOCUMENTS

| | | | |
|---|---|---|---|
| 5,258,882 A | | 11/1993 | Apple et al. |
| 5,291,110 A | | 3/1994 | Andrews, Jr. et al. |
| 5,343,403 A | * | 8/1994 | Biedle et al. ............... 700/214 |
| 5,481,514 A | | 1/1996 | Yamasaki et al. |
| 5,498,116 A | | 3/1996 | Woodruff et al. |
| 5,781,367 A | * | 7/1998 | Searle et al. ................. 360/92 |
| 5,898,593 A | | 4/1999 | Baca et al. |
| 5,943,185 A | | 8/1999 | Bracken et al. |
| 5,993,045 A | | 11/1999 | Schmidtke et al. |

FOREIGN PATENT DOCUMENTS

| | | |
|---|---|---|
| EP | 0 392 620 A2 | 10/1990 |
| JP | 61-92467 A | 5/1986 |
| JP | 62-239370 A | 10/1987 |
| JP | 62-239372 A | 10/1987 |
| JP | 62-239460 A | 10/1987 |
| JP | 63-244440 A | 10/1988 |
| JP | 2-42672 A | 2/1990 |
| JP | 3-44858 A | 2/1991 |
| JP | 3-91153 A | 4/1991 |
| JP | 4-10264 A | 1/1992 |
| JP | 4-163761 A | 6/1992 |
| JP | 5-144144 A | 6/1993 |

\* cited by examiner

Fig. 2

LIBRARY FOR STORING DATA-STORAGE MEDIA AND HAVING A REMOVABLE INTERFACE MODULE

CROSS-REFERENCE TO RELATED APPLICATIONS

This application is a continuation of U.S. patent application Ser. No. 09/791,953, filed Feb. 22, 2001, U.S. Pat. No. 6,542,787 which is a continuation of U.S. patent application Ser. No. 09/062,522, filed Apr. 17, 1998, now U.S. Pat. No. 6,266,574 issued Jul. 24, 2001. This application is also related to U.S. patent application Ser. No. 09/062,546, entitled "AN IMPROVED DOOR HINGE," filed on Apr. 17, 1998, now U.S. Pat. No. 6,163,431, and U.S. patent application Ser. No. 09/062,662, entitled "LIBRARY FOR STORING DATA-STORAGE MEDIA AND HAVING AN IMPROVED MEDIA TRANSPORTER," filed on Apr. 17, 1998.

TECHNICAL FIELD

The invention relates generally to electromechanical devices, and more specifically to a library for storing cartridges of data-storage media, such as magnetic tape, and for providing read/write access to the stored media.

BACKGROUND OF THE INVENTION

Because today's computer users often store large volumes of information on computer systems, it has become increasingly more important to backup this information to nonvolatile storage media, such as magnetic tape or CD-ROM (Compact-Disc Read-Only Memory), and to archive this media so that the stored information can be easily retrieved. Furthermore, as the amount of a user's backed-up data increases, he often archives the storage media with the aid of a computer to reduce inventory errors or other errors that may occur when the storage media are manually archived.

One type of device that is often used to archive data-storage media is a data storage library. Typically, the library is interfaced to a host computer system, and includes a media drive for reading data from and writing data to the storage media, a section for archiving the storage media, a section where an operator can load and unload the storage media, and a mechanism for transporting the storage media among the load/unload section, the archive section, and the drive. By communicating with or controlling the library, the host computer system can keep track of the specific information stored on a particular storage medium and where in the library the particular storage medium is located. Thus, when one wishes to retrieve specific archived information, the host computer can control the transport mechanism to retrieve the storage medium containing the specific information and to insert the storage medium into the media drive so that the computer can access the information.

A problem with such data storage libraries is that the on-board transport mechanism often requires a relatively large operating space, and thus significantly reduces the amount of space available for media storage.

Furthermore, in today's highly computerized environment, there are many interface protocols and formats, including SCSI, fiber-channel, and ultra-wide interfaces. Therefore, a manufacturer often must make costly and complex modifications to a library so that it can properly interface with a customer's computer system. Alternatively, the manufacturer can produce different versions of the library, one version for each interface protocol and format. But this also significantly increases overall manufacturing costs.

Additionally, many computer users want a storage library to be rack-mountable so that it can be used to archive information from an entire computer network. But many libraries cannot be rack mounted because they are not properly sized to fit within the standard rack space or because parts of the library, such as an open door, will encroach on the rack space occupied by a component mounted next to the library. Furthermore, many of the libraries that are rack-mountable use the allotted rack space inefficiently. For example, such libraries may utilize the full width of the rack space but not the full depth. Moreover, many users want the storage library to be mountable within a fraction of a standard rack width but to still have a relatively large information storage capacity.

SUMMARY OF THE INVENTION

In one aspect of the invention, a library is provided for storing a cartridge of data-storage media. The library includes a removable module and a chassis having a module receptacle. Cartridge storage slots are disposed within the chassis, and a media drive is disposed within the removable module. A cartridge transporter is disposed within the chassis and transports the cartridge between one of the cartridge slots and the media drive when the module is inserted within the module receptacle. A library control circuit is disposed within the chassis and controls the cartridge transporter. An interface circuit is disposed within the removable module and electronically interfaces a host computer to the media drive, and, when the removable module is inserted within the module receptacle of the chassis, electronically interfaces the computer to the library control circuit.

Because the interface circuitry is mounted on a removable module, a library can be quickly and easily customized by inserting a module that provides the interface used by the customer's host computer or computer network. Furthermore, only one version of the base library unit, i.e., the chassis and the components mounted within the chassis, need be manufactured. This significantly reduces the cost and complexity of the manufacturing process.

BRIEF DESCRIPTION OF THE DRAWINGS

FIG. 2 is an enlarged, exploded isometric view of portions of the storage library of FIG. 1.

DETAILED DESCRIPTION OF THE INVENTION

Figure 1:
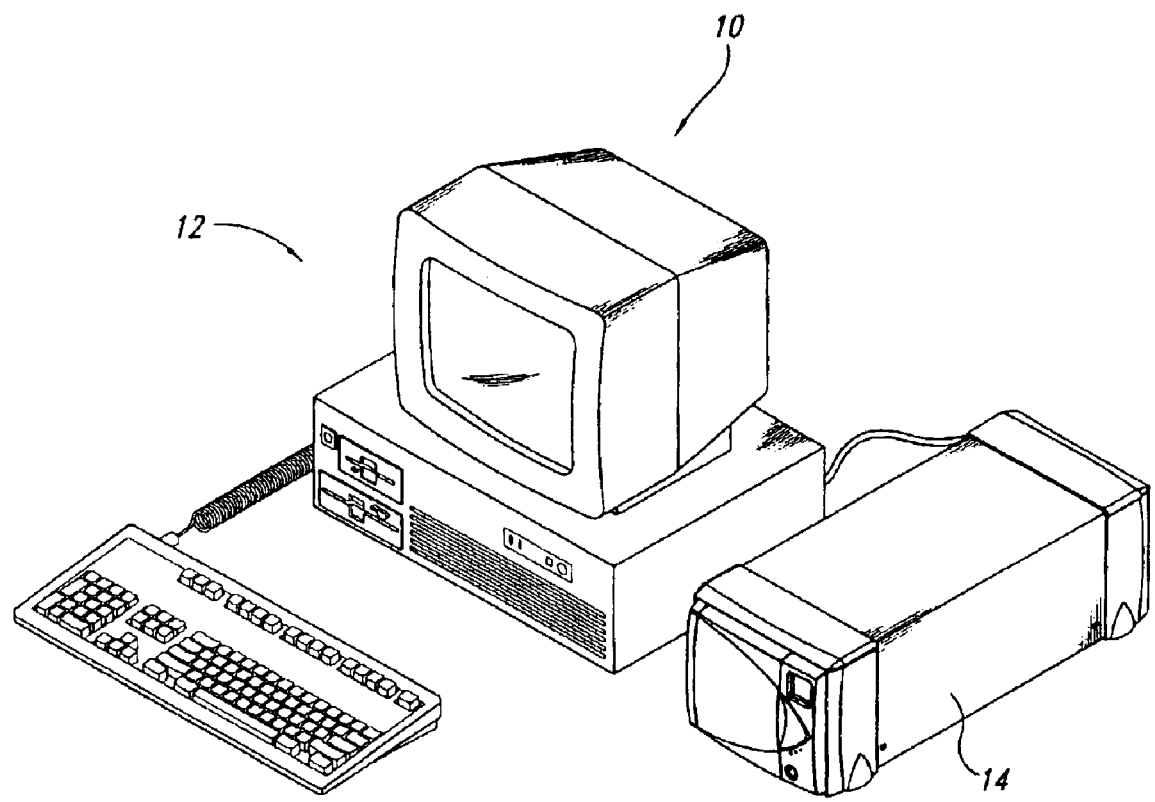
FIG. 1 is an isometric view of a computer system including a host computer coupled to a storage library that is in accordance with one aspect of the invention.
Figure 7:
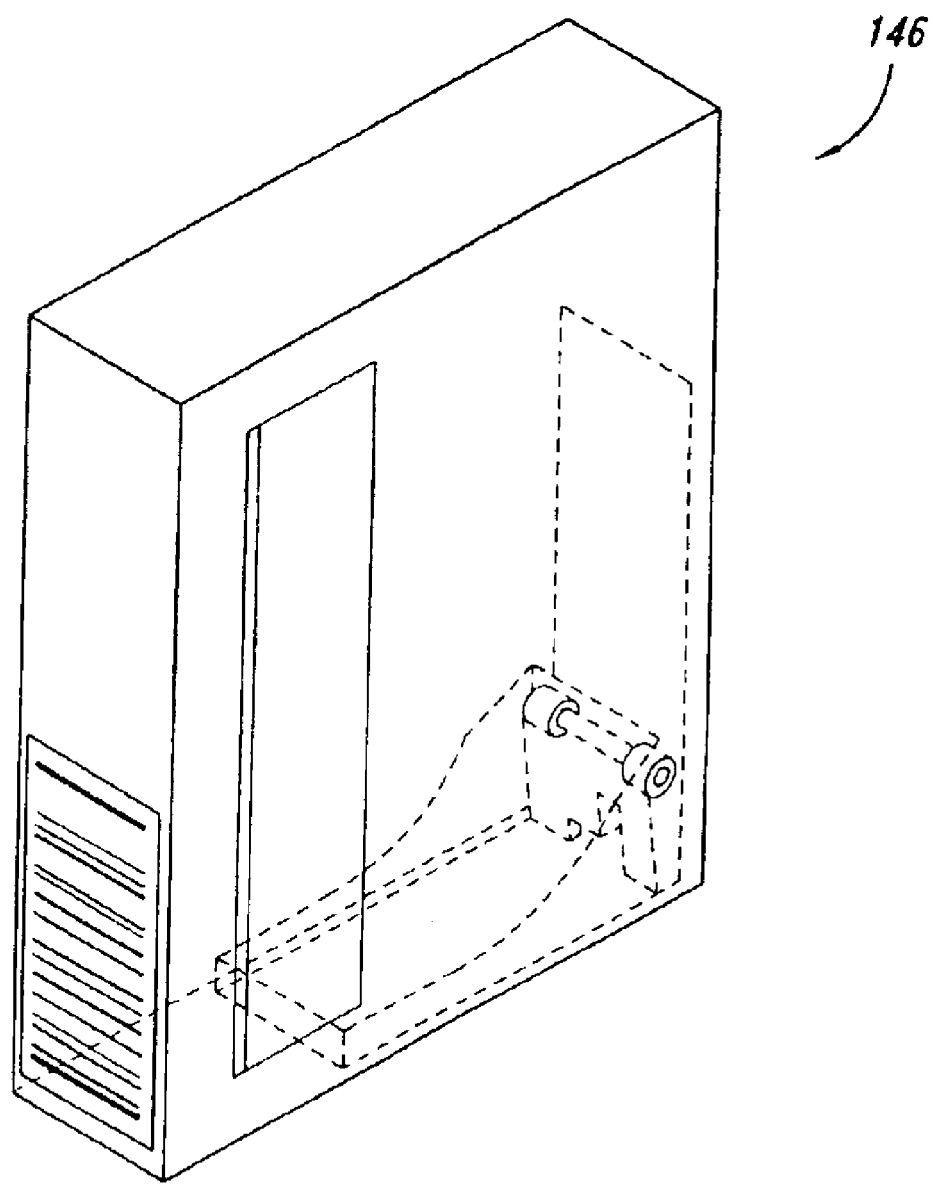
FIG. 7 is an enlarged, isometric view of a digital-linear-tape (DLT) cartridge that can be stored by one embodiment of the storage library of FIG. 1.

A computer system 10, which includes a conventional host computer 12 and an embodiment of a data storage library 14 according to the present invention, is shown in FIG. 1. The library 14 communicates with the computer 12 and allows the computer 12 to archive data to and retrieve data from one or more data storage media (such as shown in FIG. 7) such as magnetic-tape cartridges or CD-ROMs. Under control of the computer 12, the library 14 receives data from the computer 12, records the received data onto a storage medium, and then archives the storage medium in a particular location within the library 14. To later access this data, the computer 12 instructs the library 14 to retrieve the storage medium from the particular location, to read the data from the medium, and to route the read data back to the computer 12. If the computer system 10 is part of a larger computer network, then the computer 12 can be configured to allow other network components (not shown in FIG. 1), such as file servers or other computers, to archive data to and retrieve data from the library 14. Furthermore, although shown coupled to the computer 12 in a desktop configuration, the library 14 may be rack mounted and connected to a network component other than the computer 12.

Figure 2:
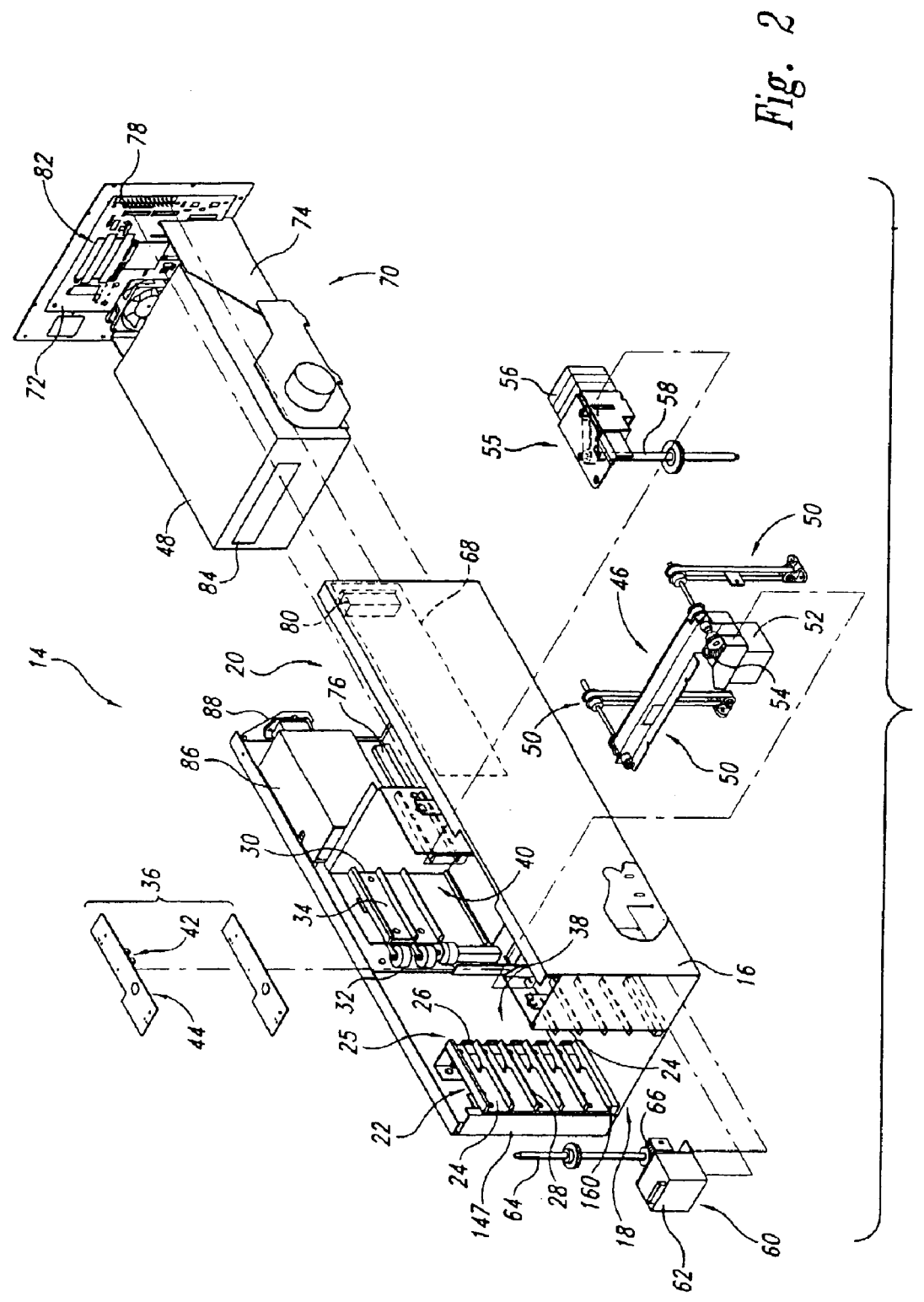
Figure 8:
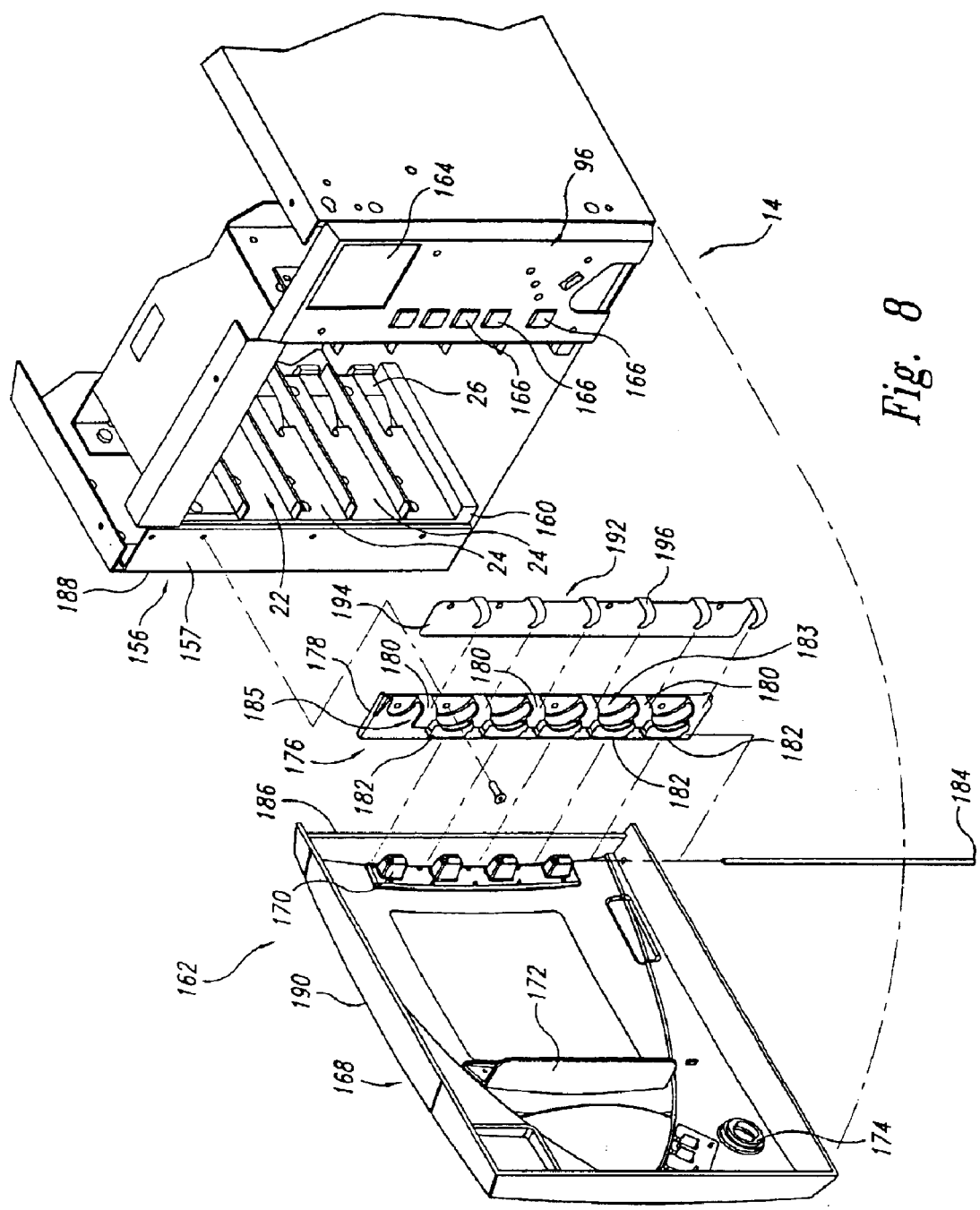
FIG. 8 is an enlarged, exploded isometric view of a door assembly for one embodiment of the storage library of FIG. 1.
Figure 11:
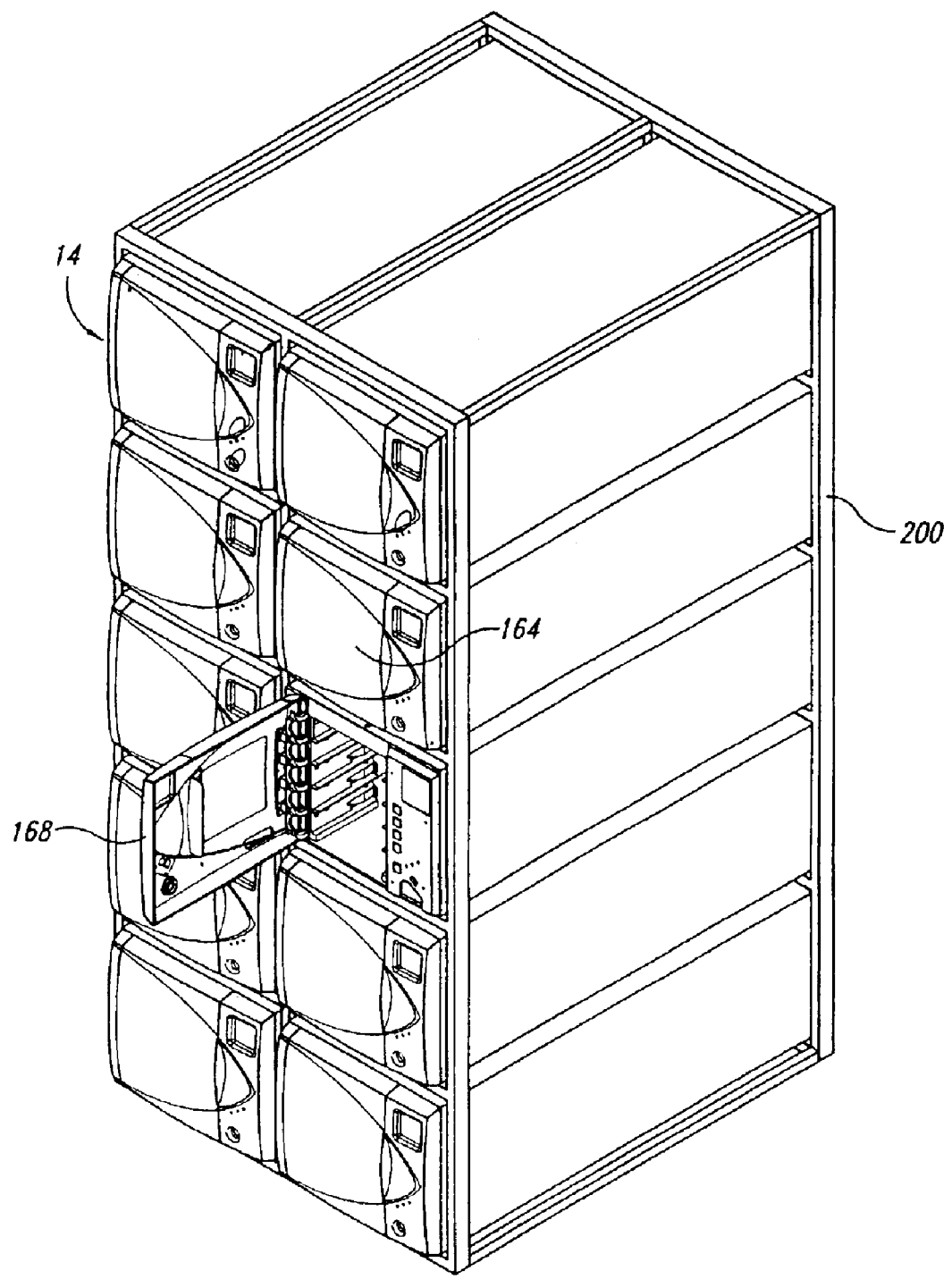
FIG. 11 is an isometric view of several storage libraries of FIG. 1, that are rack mounted and that incorporate the door assembly of FIG. 8.

FIG. 2 is an exploded isometric view of portions of the library 14 of FIG. 1. The library 14 includes a chassis 16, which has a front opening 18 and a rear receptacle 20. In one embodiment of the invention, the layout and construction of the components within the chassis 16 allow the dimensions of the chassis 16 to be such that the library 14 can be mounted in a conventional component rack (such as shown in FIG. 11). For example, the chassis 16 may be approximately half a rack width wide and substantially a full rack depth long. Furthermore, a door assembly (such as shown in FIG. 8) may be mounted to the outside of the chassis 16 at the front opening 18.

A storage-media mailbox 22 is mounted adjacent to the front opening 18 of the chassis 16 and includes a number of storage-medium slots 24, which an operator can load and unload via the front opening 18. Although the slots 24 can be constructed to hold any conventional type of a storage medium, for clarity they will be discussed hereinafter as cartridge slots 24, which can hold a conventional magnetic-tape cartridge (such as shown in FIG. 7). A latch mechanism 25 is mounted adjacent to a rear end of the mailbox 22 at the ends of the slots 24 facing toward the rear receptacle 20. The latch mechanism 25 includes one latch 26 for each slot 24 to prevent the operator from inserting a cartridge too far into a respective slot 24. Conventional optical sensor assemblies 28 are mounted along the sides of the mailbox 22, and generate respective optical beams across the slots 24. A broken beam indicates that a cartridge is currently within the respective slot 24.

Furthermore, in one embodiment, additional storage-medium slots 30, which are not part of the mailbox 22, are mounted inside of the chassis 16 above the receptacle 20 and provide additional storage capacity. Each of the slots 30 includes a respective roller 32, which guides a cartridge as it is inserted into or removed from a slot 30. Conventional optical sensor assemblies 34, which are similar to the sensor assemblies 28, are mounted along the sides of the slots 30 within the chassis 16 to generate respective optical beams across the slots 30. A broken beam indicates that a cartridge is in a respective slot 30.

Each of the slots 24 of the mailbox 22 has an inner opening 38 at the rear end of the mailbox, and a top-bottom sensor assembly 36 generates a first optical beam across all of the inner openings 38 of the slots 24. Each of the slots 30 has an opening 40 located at an end facing toward the mailbox 22, and the sensor assembly 36 also generates a second optical beam across all of the openings 40 of the slots 30. The sensor assembly 36 has the beams located such that a broken first beam indicates that a cartridge is sticking too far out from one of the slots 24, and a broken second beam indicates that a cartridge is sticking too far out from one of the slots 30. The sensor assembly 36 also includes a transporter vertical-position sensor assembly 42, which generates an optical beam located such that the beam is broken when a storage-medium transporter is in a home position. The transporter is positioned within the chassis between the mailbox 22 and the slots 30, and is discussed below in conjunction with FIG. 4. The sensor assembly 36 also includes a cam-position sensor-assembly 44, which generates an optical beam that is unbroken when a cam mechanism (such as shown in FIG. 4) of the storage-medium transporter is in a home position.

A transporter drive assembly 46 moves the storage-medium transporter in a vertical direction so as to align the transporter with a selected one of the slots 24, the slots 30, or a conventional media drive 48, which is positioned in the rear receptacle 20 and is discussed below in greater detail. The drive assembly 46 includes a belt assembly 50, which is driven by a transporter motor 52. In one embodiment, the motor 52 is a stepper motor, and a worm gear 54 is coupled to the shaft of the motor 52 and drives the belt assembly 50.

Figure 4:
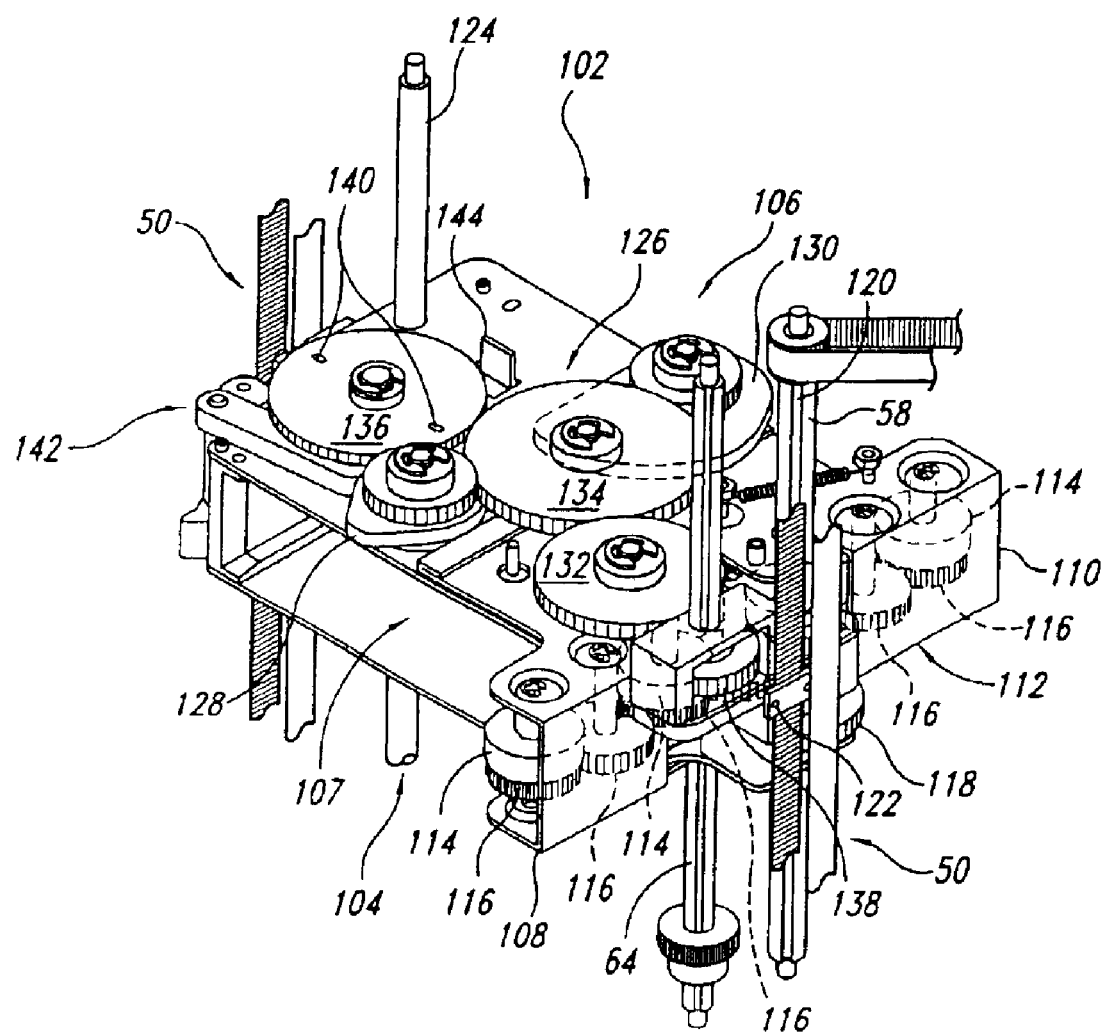
FIG. 4 is an enlarged, isometric view of the cartridge transporter of the storage library of FIG. 1.

A roller drive assembly 55 drives a roller mechanism (such as shown in FIG. 4) of the storage-medium transporter. The roller drive assembly 55 includes a roller motor 56, which drives a roller drive shaft 58. In one embodiment, the motor 56 is a stepper motor and drives the shaft 58 via a worm gear (not visible in FIG. 2).

A cam drive assembly 60 drives the cam mechanism of the storage-medium transporter. The cam drive assembly 60 includes a cam motor 62, which drives a cam drive shaft 64. In one embodiment, the motor 62 is a stepper motor and drives the shaft 64 via a worm gear 66.

A circuit board 68, which is shown in phantom line, is mounted to the inside of the chassis 16 and includes a library control circuit that controls the transporter drive assembly 46, the roller drive assembly 55 and the cam drive assembly 60, monitors the condition of the sensor assemblies 28, 34, 36, 42, and 44, and otherwise controls the operation of the library 14 as discussed below in conjunction with FIG. 3.

A module 70 fits within the rear receptacle 20 of the chassis 16. The construction of the module 70 and the rear receptacle 20 allows the operator to easily insert the module 70 into and remove the module 70 from the rear receptacle 20. The module 70 includes the media drive 48 and a circuit board 72, which includes an interface circuit (such as shown in FIG. 3) for interfacing the library control circuit on the circuit board 68 with the computer 12 of FIG. 1. The media drive 48 and the circuit board 72 are mounted to a sled 74, which, when inserted into the rear receptacle 20, engages conventional left- and right-side runners 76, which are mounted to the inside of the chassis 16. A connector 78 is mounted to the circuit board 72 and is coupled to the interface circuit on the circuit board 72. The connector 78 mates with a connector 80—which is mounted to the circuit board 68 and is coupled to the library control circuit on the circuit board 68—when the module 70 is fully inserted within the rear receptacle 20. Thus, the connectors 78 and 80 provide a communication path between the library control circuit and the interface circuit. A connector 82, which is mounted to the circuit board 72, provides a communication path between the interface circuit and the computer 12. Furthermore, when the module 70 is inserted within the rear receptacle 20, an opening 84 of the media drive 48, which receives the storage medium, is located below the slots 30 so that the storage-medium transporter can load and unload a storage medium into and from the media drive 48 via the opening 84 without interference from the slots 30. Therefore, the top-bottom sensor assembly 36 is located to also generate the second optical beam across the opening 84, so that a cartridge sticking too far out of the opening 84 will break the second beam.

Because the module 70 is easily removable and insertable, the operator or a technician can easily modify the library 14 at the factory or in the field to meet a customer's specific requirements. For example, the operator or technician can modify the interface protocol and the type of the drive 48 by merely inserting into the rear receptacle 20 another module 70 having the appropriate media drive 48 and circuit board 72. Different modules 70 can be provided for virtually all of the conventional interface protocols, including ultra-wide, fast SCSI, single-ended SCSI, differential SCSI, or fiber-channel.

Furthermore, the removable module 70 allows one to manufacture a single version of the library 14 base unit, which includes all parts of the library 14 other than those included as part of the module 70. Thus, because only different versions of the module 70 need be manufactured to meet a customer's specific interface and drive requirements, the costs and complexities of the manufacturing process are significantly less than for libraries that do not include such a removable module.

A power supply 86 and a power connector 88 are also mounted within the chassis 16. When connected to an external power source (not shown in FIG. 2) via the connector 88, the power supply 86 provides power to the circuit board 68, the drive assemblies 46, 55, and 60, and the sensor assemblies 28, 34, 36, 42, and 44, and to the media drive 48 and the circuit board 72 when the module 70 is installed within the rear receptacle 20.

Figure 3:
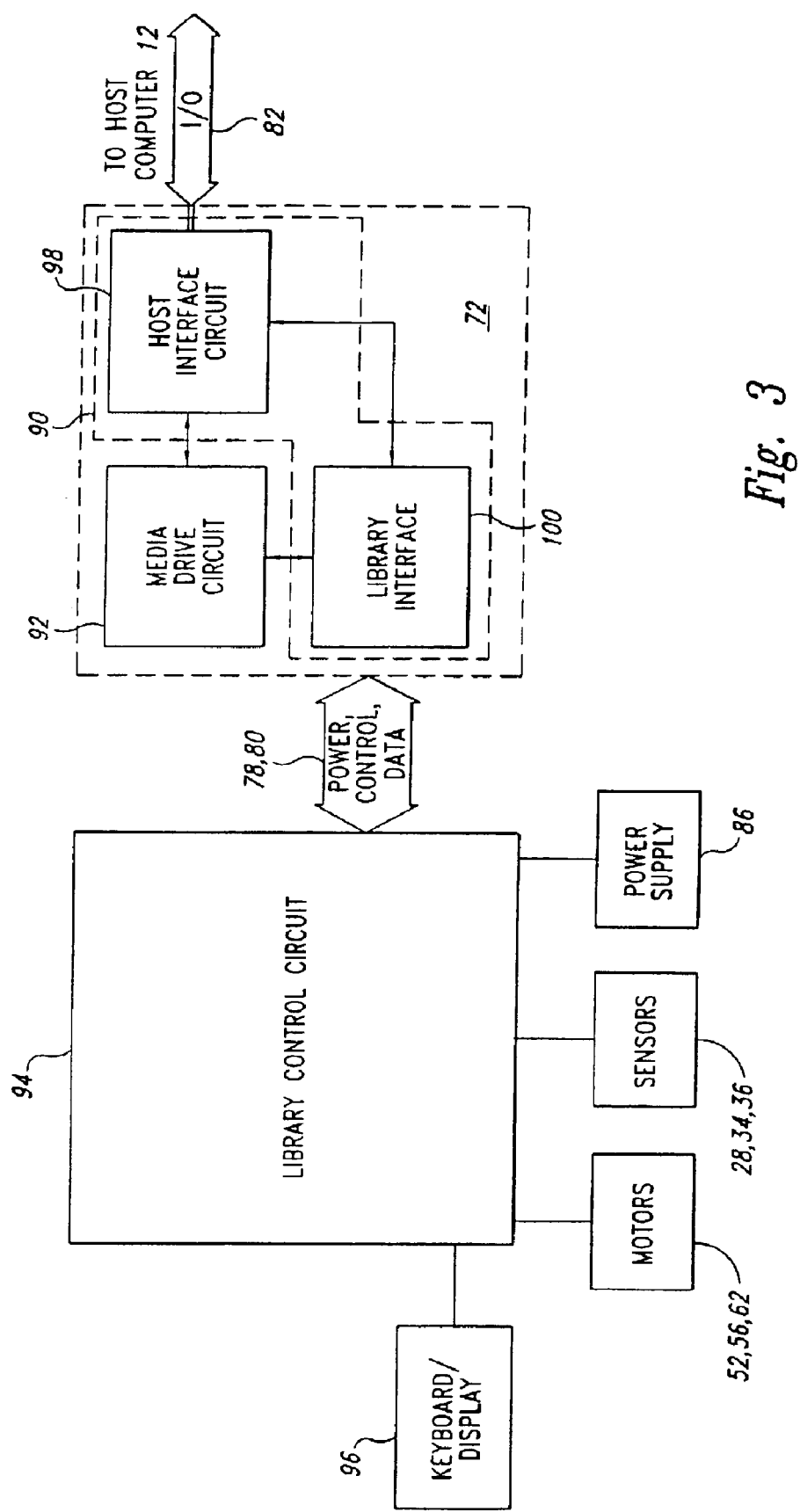
FIG. 3 is a block diagram of the circuitry of the storage library of FIG. 1.

FIG. 3 is a schematic block diagram of the electronic circuitry of the library 14 of FIG. 2. But because the specific circuitry used within each of the blocks is conventional, it is not discussed in detail.

This circuitry includes an interface circuit 90 and a media drive circuit 92. The circuit 90 communicates with the computer 12 of FIG. 1 via the connector 82 and is located on the circuit board 72, which, as discussed above in conjunction with FIG. 2, is located on the removable module 70. The media drive circuit 92 communicates with the interface circuit 90, and may be located entirely within the media drive 48 of FIG. 2, entirely on the circuit board 72, or may have a portion that is located within the media drive 48 and another portion that is located on the circuit board 72.

A library control circuit 94 is located on the circuit board 68 of FIG. 2 and communicates with the motors 52, 56, and 62, the sensor assemblies 28, 34, 36, 42 and 44, and the power supply 86 all of FIG. 2, and a keyboard display assembly 96, which allows the operator to input data or commands directly into the library 14 and to select different software options that the control circuit 94 supports. In one embodiment, the library control circuit 94 includes one or more conventional microprocessors or microcontrollers (not shown in FIG. 3). Furthermore, the connectors 78 and 80 allow power, control information, and data to be passed back and forth between the library control circuit 94 and the interface circuit 90.

In one embodiment, the interface circuit 90 includes a host interface circuit 98 and a library interface circuit 100. The host interface circuit 98 is coupled to the computer 12 via the connector 82, and is also coupled to the library interface circuit 100, which is coupled to the library control circuit 94. The media drive circuit 92 is coupled to the host interface circuit 98, and in one embodiment is also coupled to the library interface circuit 100.

FIG. 4 is an isometric view of a storage-medium transporter 102, which is mounted in the chassis 16 of FIG. 2 between the mailbox 22 and the slots 30 such that a front opening 104 of the transporter 102 faces the mailbox 22 and a rear opening 106 faces the slots 30 and the rear receptacle 20. In one embodiment, the transporter 102 moves vertically up and down and is constructed to bi-directionally transport a magnetic-tape cartridge, such as a DLT cartridge (such as shown in FIG. 7), through a passageway 107 extending between the front and rear openings 104 and 106. Therefore, although the transporter 102 can be constructed to transport any type of storage medium, for example purposes, the embodiment of the transporter 102 hereinafter described will be for transporting a DLT cartridge.

The transporter 102 includes spring-loaded front and rear roller arms 108 and 110, which each pivot between an opened and closed position to respectively release and grasp a cartridge. Each of the roller arms 108 and 110 carries a respective portion of a roller mechanism 112, which includes a number of rollers 114. The rollers 114 are rotationally intercoupled by meshing gears 116. The roller drive shaft 58 rotates a roller drive gear 118, which in turn drives the rollers 114 via the gears 116. The shaft 58 has a slot or keyway 120, which engages a spline or key along the inner circumference of the gear 118 to allow the gear 118 to move freely up and down on the shaft 58 as the transporter 102 moves up and down.

The transporter 102 is fixedly attached to the belt assembly 50 by belt couplings 122. Furthermore, a support shaft 124 guides and stabilizes the transporter 102 as it is moved up and down along the shaft 124 by the belt assembly 50.

The transporter 102 also includes a cam mechanism 126, which includes a latch-release-and-front-roller-arm cam 128, a final-push-and-rear-roller-arm cam 130, and cam intercoupling gears 132, 134, and 136. The cam drive shaft 64 rotates a cam drive gear 138, which in turn drives the cam mechanism 126. Like the roller drive shaft 58 and the roller drive gear 118, the cam drive shaft 62 has a keyway and the cam drive gear 138 has a key such that the cam drive gear 138 can move freely up and down on the cam drive shaft 62 as the transporter 102 moves up and down. The cam gear 136 includes at least one homing opening 140, which, when aligned with the optical beam generated by the cam sensor assembly 44 of FIG. 2, indicates that the cam mechanism 126 is in a home position. Portions of the transporter 102 that are positioned below the gear 136 have openings that are aligned with the optical beam of the cam sensor assembly 44 such that when the opening 140 is in the home position, the beam can pass through the opening 140 uninterrupted.

The transporter 102 also includes a latch-plunger assembly 142, which releases the latch mechanism 25 of FIG. 2 when the transporter 102 is removing a cartridge from the mailbox 22. The transporter 102 also includes a homing tab 144, which breaks the optical beam generated by the vertical-position sensor assembly 42 of FIG. 2 when the transporter 102 is in a home position.

Referring to FIGS. 2, 3, and 4, during operation of the library 14, the operator inserts a cartridge into one of the slots 24 in the mailbox 22 until the latch 26 of the slot stops the operator from inserting the cartridge any farther. Next, the transporter motor 52 rotates and the transporter drive assembly 46 moves the transport 102 upwards until the homing tab 144 breaks the beam generated by the sensor assembly 42. Then, the library control circuit 94 receives from the respective optical sensor assembly 28 a signal that indicates that the cartridge is within the slot 24. The circuit 94 next controls the transporter motor 52 to rotate a known number of steps so that the drive assembly 46 moves the transporter 102 downward until the front opening 104 of the transporter 102 is aligned with the slot 24 containing the cartridge. The counting of the steps may be conventional, or may take into account the backlash of the transporter drive assembly 46 as discussed below.

FIGS. 5A–5D show respective positions of the roller mechanism 112 and the cam mechanism 126 during a load/unload sequence where the transporter 102 retrieves a cartridge 146 from one of the storage slots 24 of FIG. 2 and loads the cartridge into one of the slots 30 or the media drive 48 of FIG. 2.

Figure 5A:
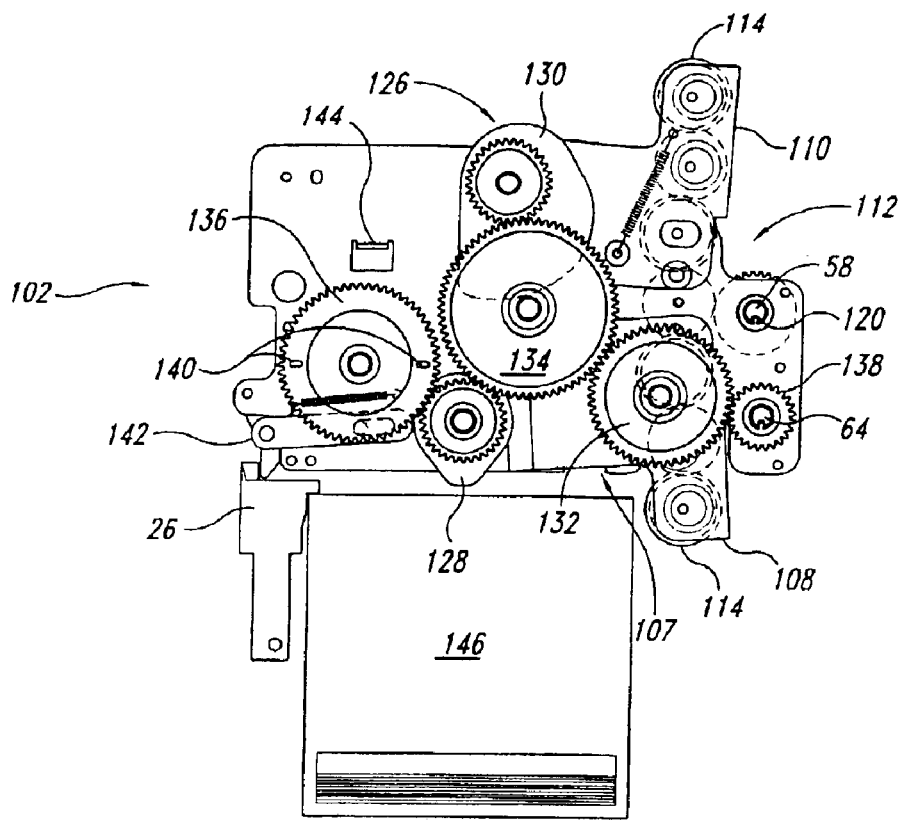
FIGS. 5A–5D show the respective positions of the cam mechanism and roller mechanism of the cartridge transporter of FIG. 4 during a sequence where the transporter retrieves a cartridge from a storage slot and loads the cartridge into a media drive.

Referring to FIG. 5A, at some time before the transporter 102 moves into its home position, the cam motor 62 rotates until the cam mechanism 126 is in the home position. In this position, both of the front and back roller arms 108 and 110 are in their respective opened positions such that as the transporter 102 moves, the arms 108 and 110 will not contact a cartridge 146 that is in one of the slots 24 or 30. As stated above, the circuit 94 of FIG. 3 determines that the cam mechanism 126 is in the home position when the optical beam generated by the sensor assembly 44 of FIG. 2 is unbroken. In one embodiment, the gear ratios of the cams 128 and 130 and the gears 132, 134, and 136 are such that the cam mechanism 126 is in the home position when either of the two openings 140 is aligned with the optical beam.

Still referring to FIG. 5A, it is known that in most gear systems, such as the cam mechanism 126, there occurs a phenomenon known as backlash. The degree of backlash is the amount of free play between the gears as they rotate from one direction to another direction. That is, the manufacturing tolerances of the gear-tooth widths are often such that when the teeth of one gear are entered between the respective teeth of a meshing gear, there are spaces between the adjacent gear teeth. Thus, before they engage, the gears must rotate slightly until one tooth contacts an adjacent tooth of a meshing gear. Therefore, because the next position of the cam mechanism 126 is determined by counting the number of steps that the cam motor 62 of FIG. 2 rotates from the present position, the circuit 94 of FIG. 3 may be programmed to account for the backlash when the rotational direction of the present rotation of the cam motor 62 is different than the rotational direction of the immediately previous rotation.

In one embodiment, the circuit 94 accounts for backlash by storing the number of rotational steps of the cam motor 62 needed to compensate for the backlash. This number then becomes part of the total number of steps required to rotate the cam motor 62 so that the cam mechanism 126 will be in the desired position relative to the present position. The backlash number may be empirically determined, or may be determined for each cam mechanism 126 by rotating the cam mechanism 126 in a first direction until the gears engage, rotating the cam mechanism in a second direction until the gears engage, and counting the number of steps that the cam motor 62 rotates in the second direction. For example, after the cam mechanism 126 is moved in a first direction into the home position, the circuit 94 counts the number of steps—the backlash number—that the cam motor 62 must rotate in the opposite direction to move the cam mechanism 126 out of the home position. As discussed above, this type of backlash compensation can also be used in the transporter drive assembly 46. But backlash is typically much less of a problem for a belt drive, and thus can often be ignored in a belt-driven assembly such as used for the transporter drive assembly 46.

Figure 5B:
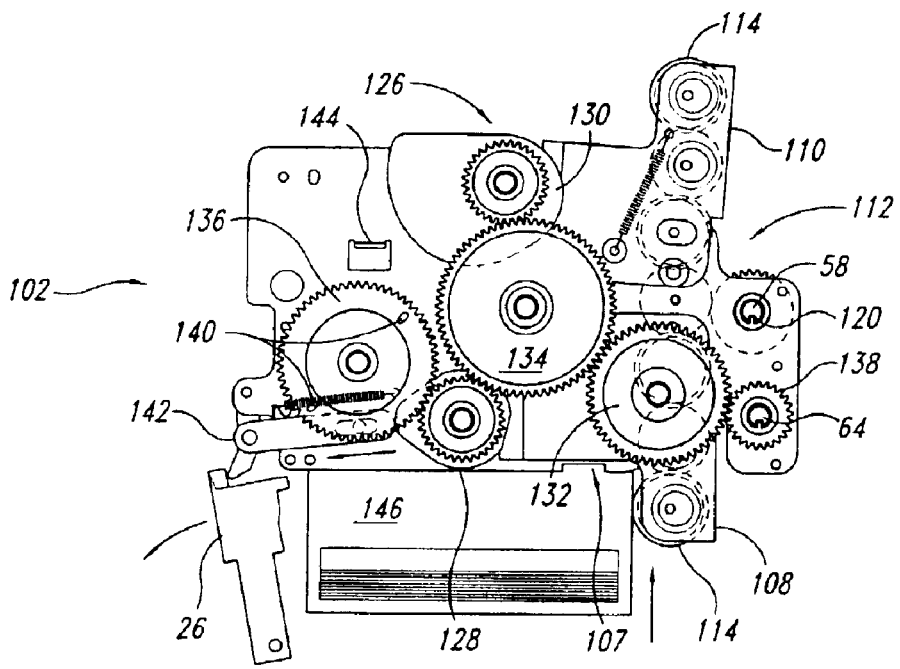

Referring to FIG. 5B, once the transporter 102 has been aligned with the appropriate slot 24 of FIG. 2, the cam motor 62 of FIG. 2 rotates the appropriate number of steps such that the cam mechanism 126 is in the mailbox-unload position. In this position, the cam 128 causes the latch-plunger assembly 142 to disengage the latch 26 of the slot 24 so that the transporter 102 can unload the cartridge 146 from the slot 24. The cam 128 also causes the front roller arm 108 to close such that the rollers 114 of the roller mechanism 112 engage the side of the cartridge 146. The roller motor 56 of FIG. 2 then rotates a predetermined number of motor steps to rotate the rollers 114 such that they approximately center the cartridge 146 within the passageway 107 of the transporter 102. In one embodiment, the circuit 94 of FIG. 3 compensates for backlash in the roller mechanism 112 as discussed above for the cam mechanism 126.

Still referring to FIG. 5B, the transporter motor 52 of FIG. 2 rotates a predetermined number of motor steps to move the transporter 102 up or down as needed to align the cartridge 146 within the transporter 102 with its destination, which is either one of the slots 30 or the opening 84 of the media drive 48, all of FIG. 2. The rear roller arm 110 remains open so that as the transporter 102 moves, the roller arm 110 does not contact another cartridge 146 that may be in another one of the slots 30 other than the destination slot 30.

Figure 5C:
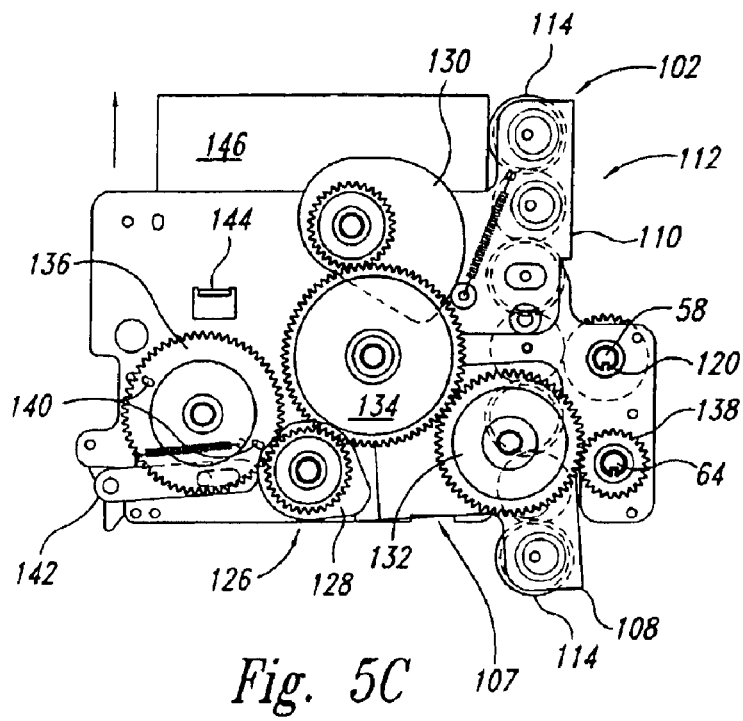

Referring to FIG. 5C, after the cartridge 146 has been aligned with its destination, the cam motor 62 of FIG. 2 rotates a predetermined number of steps such that the cam mechanism 126 is in a media-drive/rear-slot unload position. In this position, the cam 128 disengages the latch-plunger assembly 142 and opens the front roller arm 108. Furthermore, the cam 130 closes the rear roller arm 110. Once the rear roller arm 110 is closed, the roller motor 56 of FIG. 2 rotates a predetermined number of steps such that the rollers 114 move the cartridge 146 into its destination.

If, as shown in FIG. 5C, the destination is one of the slots 30 of FIG. 2, then the circuit 94 of FIG. 3 monitors the sensor assembly 36 of FIG. 2 to determine if the second optical beam that is directed across the openings 40 of the slots 30 and the opening 84 of the media drive 48 is broken or unbroken. If the beam is unbroken, then the circuit 94 determines that the cartridge 146 has been fully inserted into the destination slot 30. If the beam is broken, then the circuit 94 causes the roller motor 56 to rotate additional steps until the rollers 114 insert the cartridge 146 fully into the destination slot 30. Alternatively, instead of counting the number of steps that the roller motor 56 rotates, the circuit 94 can cause the roller motor 56 to continue rotating until the beam is unbroken, thus indicating that the cartridge 146 has been fully inserted into the destination slot 30.

Figure 5D:
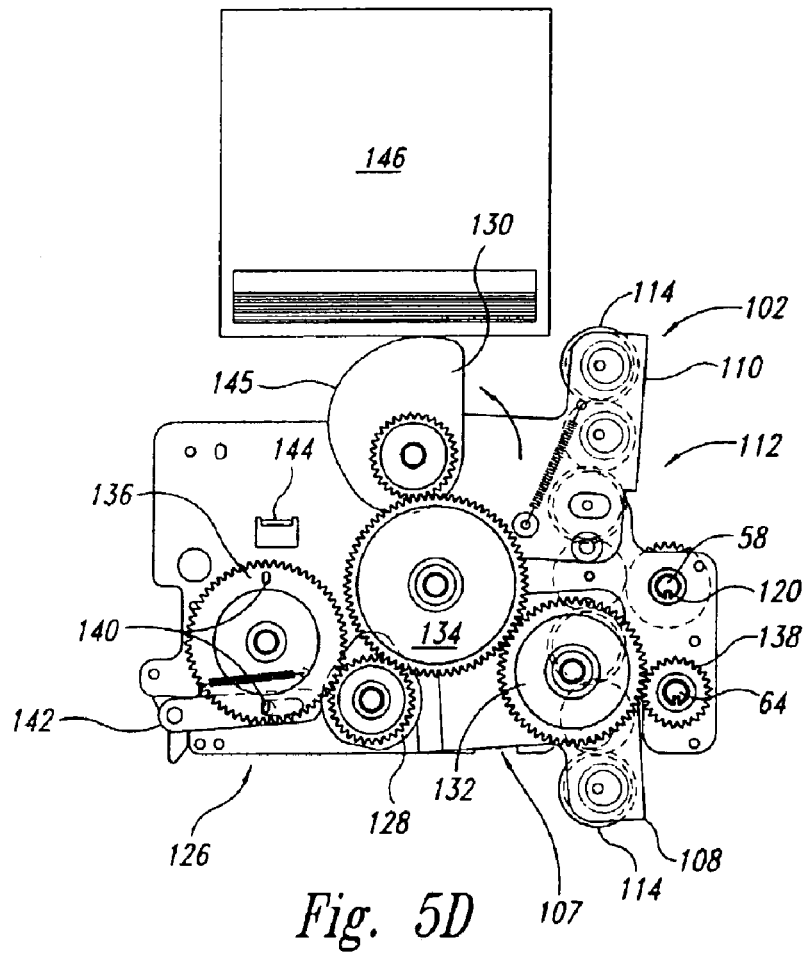

If, as shown in FIG. 5D, the cartridge destination is the media drive 48 of FIG. 2, then the rollers 114 often cannot fully insert the cartridge 146 into the opening 84 of the media drive 48. Thus, after the initial moving of the cartridge into its destination as described in conjunction with FIG. 5C, the cartridge 146 is often inserted only part way into the opening 84. Therefore, the second optical beam is broken, and the circuit 94 of FIG. 3 controls the cam mechanism 126 to perform an additional step called the "final push." During this step, the cam mechanism 126 pushes the cartridge 146 the remaining way into the opening 84, or at least far enough into the opening 84 so that the conventional cartridge intake mechanism of the media drive 48 is activated. Once activated, the intake mechanism retracts the cartridge 146 the remaining way into the media drive 48. More specifically, the transporter drive assembly 46 moves the cartridge transporter 102 such that the cam 130 is aligned with the opening 84 of the media drive 48. The cam 130 rotates in the direction shown by the arrow in FIG. 5D so as to open the rear roller arm 110 and push the cartridge 146 into the opening 84. In one embodiment, this is the only step where the rotational direction of the cam mechanism 126, specifically the rotational direction of the cam 130, is not arbitrary, but is in the indicated direction so that a gradually sloped surface 145 of the cam 130 engages the cartridge 146 and provides a relatively smooth push thereto. In another embodiment, the cam 130 is more symmetrically shaped such that it can rotate in either direction for the final push.

Although FIGS. 5A–5D describe a sequence of steps for transporting a cartridge 146 from one of the slots 24 of FIG. 2 to one of the slots 30 or the media drive 48, the sequence is reversed for transporting the cartridge 146 from the slot 30 or the media drive 48 to a slot 24.

Figure 6:
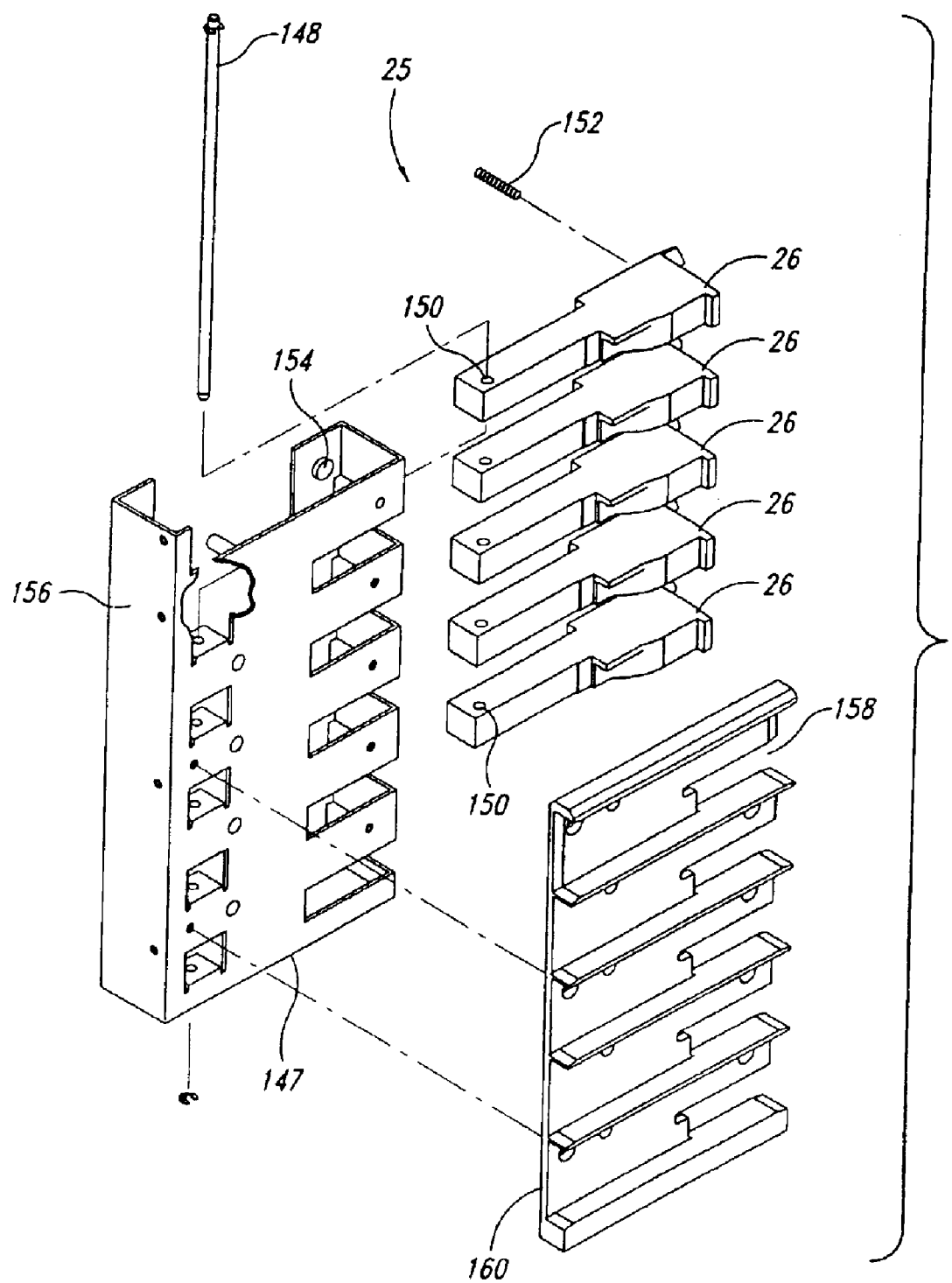
FIG. 6 is an enlarged, exploded isometric view of the latch mechanism of the storage library of FIG. 1.

FIG. 6 is an exploded isometric view of the latch mechanism 25, which is supported by a support wall portion 147 of the mailbox 22 of FIG. 2. The latch mechanism 25 includes a pivot pin 148, which extends through an opening 150 formed in each of latches 26. A latch spring 152 is positioned between the back side of each latch 26 and a respective spring receptacle 154, which is located on a mailbox support and jamb member 156 of the mailbox 22. For clarity, only one spring 152 and one receptacle 154 are shown in FIG. 6. The latches 26 are biased by the springs 152 to extend through respective latch openings 158 in a side portion 160 of the mailbox 22. The latches 26 are pivoted back so as not to extend through the respective latch openings 158 when the latch-plunger assembly 142 of FIG. 4 engages them.

A conventional DLT cartridge 146, such as shown in FIGS. 5A–5D, is shown in FIG. 7 with portions shown in phantom line. Although one embodiment of the library 14 is constructed to receive DLT cartridges, other embodiments of the library 14 can be constructed to receive other types of storage media such as 4 millimeter (mm) and 8 mm tape cartridges. In such embodiments, the mailbox 22 and the slots 30 of FIG. 2 are constructed to respectively receive such other media cartridges, and the respective removable module 70 of FIG. 2 includes a media drive 48 for accepting such cartridges.

FIG. 8 is an exploded isometric view of one embodiment of the keyboard/display panel 96 of FIG. 3 and one embodiment of a door assembly 162 for the library 14 of FIG. 1. The keyboard/display panel 96 includes a conventional display 164 and conventional punch keys 166, and allows the operator to manually input data and instructions to the library control circuit 94 of FIG. 3. The library control circuit 94 may also display a software menu from which the operator can select function options with the keys 166.

The door assembly 162 includes a door 168 having hinge cylinders 170 and a cartridge-alignment protrusion 172, which engages the cartridge or cartridges 146 of FIG. 7 and ensures that they are fully inserted into the slots 24 when the door 168 is closed. The door 168 may also include a lock 174, which impedes unauthorized access to the mailbox 22 and any cartridges 146 therein. The lock 174 may be a conventional key lock, or may be an electronic lock that is controlled by the computer 12 of FIG. 1 via the library control circuit 94 of FIG. 3.

The door assembly 162 also includes a hinge assembly 176, which includes a support plate 178, resilient extensions or fingers 180, and hinge cylinders 182. The support plate 178 is attached to a forward-facing front jamb portion 157 of mailbox jamb member 156, and the hinge cylinders 170 of the door 168 are pivotally connected to the hinge cylinders 182. The hinge cylinders 170 and 182 are retained in an interlocked position by a hinge pin 184 extending therethrough. The fingers 180 extend out from an edge of the support plate 178 and curve towards the front side of the support plate 178. The hinge cylinders 182 are attached between the ends of adjacent ones of the fingers 180. In one embodiment, resulting spaces 183 are defined between adjacent ones of the fingers 180. The spaces 183 are shaped to allow the operator to position a finger therein so that the hinge assembly 176 does not hinder the operator when grasping the cartridge 146 to insert or remove the cartridge 146 from one of the slots 24. Furthermore, the fingers 180 are relatively rigid and resist movement in a vertical direction to provide solid support for the weight of the door 168.

Figure 9:
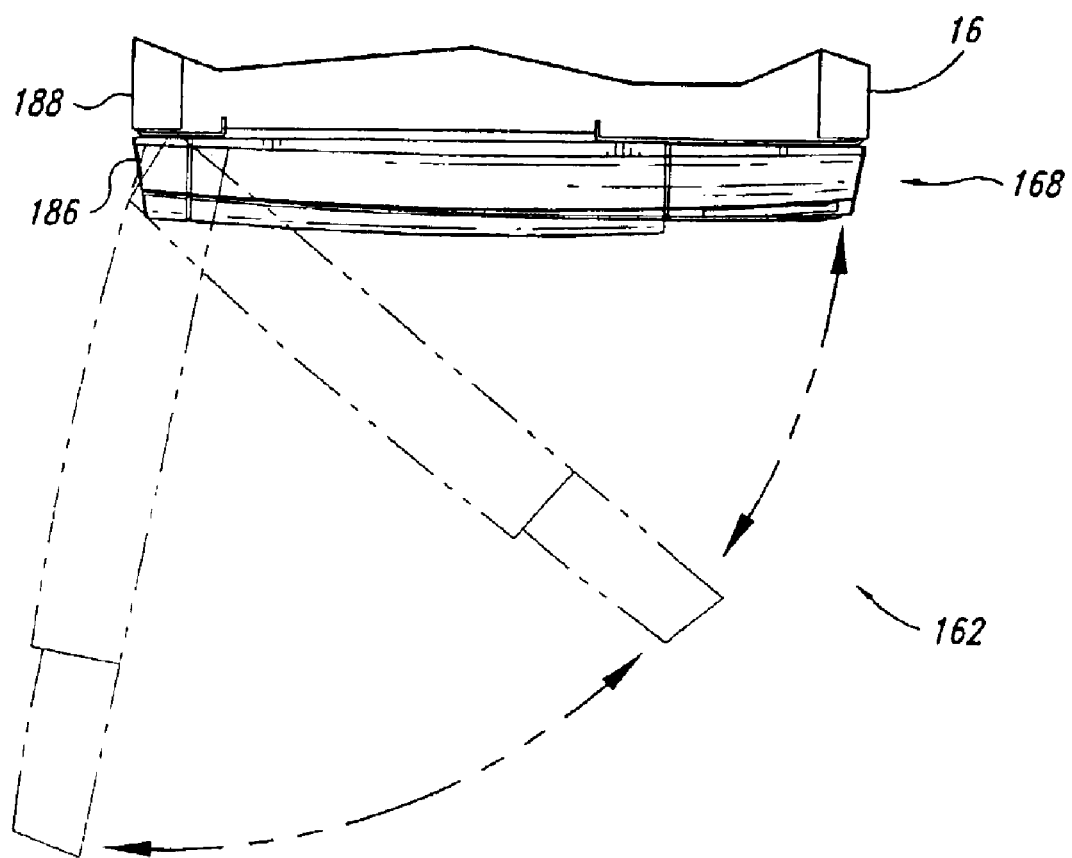
FIG. 9 is a top view of the door assembly of FIG. 8.

FIG. 9 is a top view of the door assembly 162, and shows various positions of the door 168 as it moves between opened and closed positions. Referring to FIGS. 8 and 9, the hinge cylinders 170 and 182 of the door assembly 162, and the hinge pin 184 which extends therethrough, are offset laterally inward from the sidewall 188 of the library chassis 16 so that the door 168 can be opened without encroaching on an adjacent rack space. Specifically, a hinged side 186 of the door 168 is positioned at or inward from the sidewall 188 of the library chassis 16 when the door is closed. Thus, when the door 168 is in the closed position, it covers virtually the entire front side of the library 14, including the hinge assembly 176, without encroaching on the space occupied by any adjacent rack-mounted components, such as another library 14. Furthermore, as the door 168 is opened or closed, the hinge assembly 176, as discussed below, prevents the hinged side 186 of the door 168 from encroaching on the adjacent rack space by reducing the distance that the hinged side 186 extends beyond the sidewall 188 as compared with conventional hinges. In one embodiment, no part of the hinged side 186 extends beyond the sidewall 188 when the door 168 is opened, closed, or in any position therebetween.

Figure 10A:
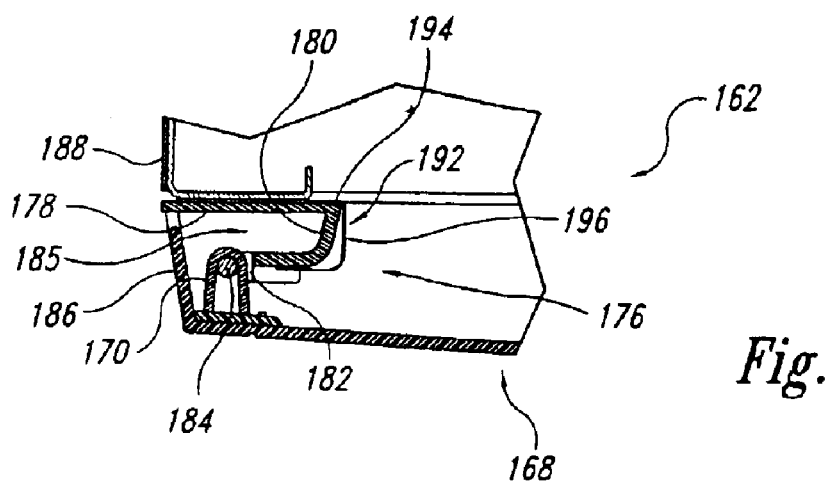
FIGS. 10A–10C are cut-away top views of the door assembly of FIGS. 8 and 9.
Figure 10B:
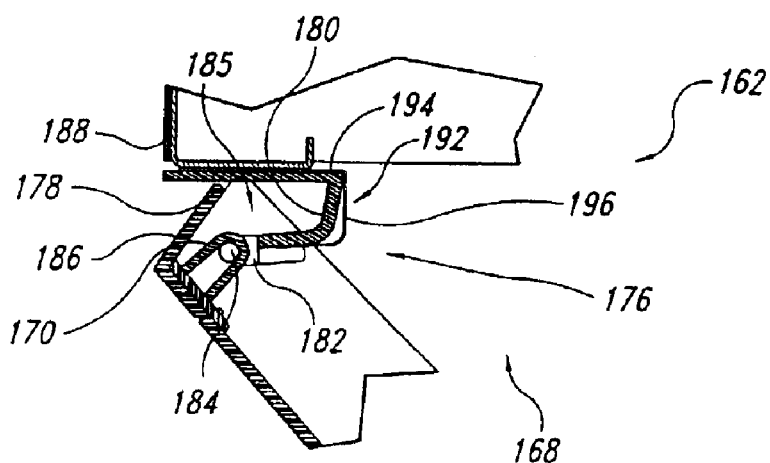
Figure 10C:
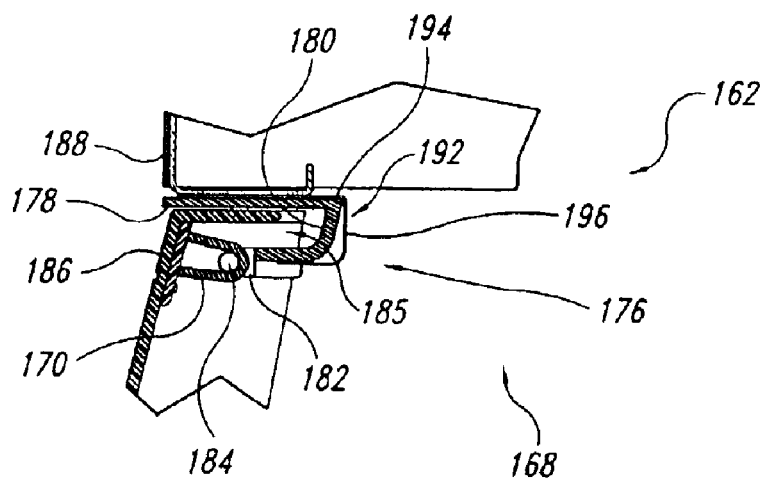

FIGS. 10A–10C are cut-away top views of the door assembly 162 and the hinge assembly 176 when the door 168 is in a closed position, intermediate position, and opened position, respectively. Referring to FIG. 10A, the fingers 180 project forward from the support plate 178 and curve laterally outward to position the hinge cylinders 182 spaced apart from the support plate 178 and to define a laterally open space 185 therebetween. Referring to FIG. 10B, as the door 168 is rotated into the opened position, the hinged side 186 of the door 168 moves into the space 185 so that the door 168 may be opened and closed uninhibited by the offset hinge-line arrangement used. Specifically, fingers 180 are flexible in the outward (away from the chassis 16)

and inward (toward the chassis 16) directions such that as the hinged side 186 engages the front of the plate 178, the fingers 180 flex to allow the hinged side 186 to slide against the plate 178 as the door 168 moves between closed and opened positions. Furthermore, in one embodiment, the spring force with which the fingers 180 push the hinged side 186 against the plate 178 is sufficient for the door 168 to be stable in many partially open positions. Referring to FIG. 10C, when the door 168 is fully open, the fingers 180 return to their unflexed positions (as in FIG. 10A), and the hinged side 186 is parallel or approximately parallel to and abuts the plate 178. Because moving the door 168 toward the closed position causes the fingers 180 to flex outward and force the side 186 against the plate 178, the hinge assembly 176 tends to hold the door 168 open against unintentional closing.

Referring to FIGS. 9 and 10C, in some embodiments, depending on the angle the side 186 makes with a door front face 190, the door 168 may open more than 90° such that portions of the front face 190 may extend beyond the chassis sidewall 188. But this typically does not cause the door 168 to significantly encroach upon an adjacent space, because an adjacent component typically does not extend forward far enough for these encroaching portions of the front face 190 to contact the adjacent component. But even if it is possible to open the door 168 far enough to encroach, the door 168 need not open to more than an approximately 90° position—which is not encroaching—to allow the operator to insert and remove a cartridge 146 from the mailbox 22.

Referring to FIGS. 8 and 10B, in one embodiment, the fingers 180 are, formed from a conventional plastic. But it has also been found that with repeated openings and closings of the door 168, the fingers 180 may become deformed from their desired shape. That is, the resiliency of the fingers 180 may be too low, and thus the hysteresis of the fingers 180 may be too high, for the fingers 180 to maintain their desired shape. Therefore, a metal spring member 192 overlaying the fingers 180 is used to increase the effective resiliency of the fingers 180. The spring member 192 includes a plate 194 that is installed between the jamb portion 157 of the mailbox member 156 and the hinge plate 178. The spring member 194 also includes fingers 196, which extend around and overlay the fingers 180. The spring member 194 is formed from a material, such as metal, that has a significantly higher resiliency than the material from which the fingers 180 are formed. Thus, the fingers 196 of the spring member 194 force the respective fingers 180 back into their desired shapes after each opening and closing of the door 168. An actual door assembly 162 in accordance with this embodiment has been tested over a million times, and has been found to be very reliable.

Furthermore, referring to FIGS. 8, 9, and 10c, it is noted that with the described door assembly 162, if the door 168 is pressed open farther than the intended fully open position, the opening force applied to move it beyond the fully open position will be resisted by the spring force of the fingers 180, and if present, the spring member 192. Thus, the fingers 180 and 196 can bend under this excess opening force without the hinge assembly 176 breaking.

FIG. 11 is an isometric view of ten of the libraries 14—of FIG. 1 mounted in a rack 200. As shown, neither the opened nor closed doors 168 of the libraries 14 encroach on the respective rack spaces occupied by the adjacent libraries 14.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A library for storing a cartridge of data-storage media, the library being connectable to a power source, comprising:
    a removable module having a first signal connector and a first powerline;
    a chassis having a module receptacle sized to receive the removable module, the module receptacle having a second signal connector that releasably mates with the first signal connector when the removable module is in the module receptacle, the module receptacle having a second powerline coupleable to the power source and coupleable to the first powerline;
    cartridge storage slots disposed within the chassis;
    a media drive disposed within the removable module and coupled to the first powerline, the media drive having a drive opening, the media drive operable to receive and eject the cartridge through the drive opening;
    a cartridge transporter disposed within the chassis and operable to transport the cartridge between one of the cartridge slots and the media drive when the module is disposed within the module receptacle;
    a library control circuit disposed within the chassis, coupled to the second powerline, and coupled to the cartridge transporter; and
    an interface circuit disposed within the removable module, coupled to the first powerline, and coupled to the media drive, the interface circuit being operable to interface with a host computer that is external to the chassis, and being coupled to the library control circuit when the removable module is disposed within the module receptacle, wherein power is provided from the library control circuit to the interface circuit and the media drive when the removable module is in the module receptacle.

2. The library of claim 1 wherein the interface circuit comprises:
    a library interface circuit coupled to the library control circuit when the removable module is disposed within the module receptacle; and
    a host interface circuit coupled to the media drive and to the library interface circuit, and operable to interface with the host computer.

3. The library of claim 1 wherein the interface circuit comprises:
    a library interface circuit coupled to the library control circuit when the removable module is disposed within the module receptacle and coupled to the media drive; and
    a host interface circuit coupled to the media drive and to the library interface circuit, and operable to interface with the host computer.

4. The library of claim 1 wherein the library control circuit is operable to provide power to the media drive and to the interface circuit when the removable module is disposed within the module receptacle.

5. The library of claim 1 wherein the interface circuit is operable to couple data between the host computer and the media drive when the removable module is disposed within the module receptacle.

6. The library of claim 1 wherein the interface circuit is operable to couple control information between the host computer and the library control circuit when the removable module is disposed within the module receptacle.

7. The library of claim 1, further comprising a media-drive read-write-and-control circuit that is disposed within the removable module and that is coupled to the media drive and to the interface circuit.

8. The library of claim 1 wherein the host computer comprises a component of a computer network.

9. A library for storing a cartridge of data-storage media, comprising:
- a sled having a first signal connector, a first powerline, and a host signal connector;
- a chassis having a sled receptacle that is constructed to allow insertion and removal of the sled therein, the sled receptacle having a second powerline coupled to the first powerline, and a second signal connector that mates with the first signal connector when the sled is inserted into the sled receptacle;
- cartridge storage slots disposed within the chassis;
- a media drive mounted within the sled and having a cartridge receptacle;
- a cartridge transporter assembly mounted within the chassis;
- a library control circuit mounted within the chassis, coupled to the second powerline, and coupled to the cartridge transporter assembly and to the second signal connector; and
- an interface circuit mounted within the sled and coupled to the media drive, to the first signal connector, and to the host signal connector, wherein power is provided from the second powerline to the interface circuit and to the media drive when the sled is inserted into the sled receptacle.

10. The library of claim 9 wherein the interface circuit comprises:
- a library interface circuit coupled to the second signal connector; and
- a host interface circuit coupled to the media drive, to the library interface circuit, and to the host signal connector.

11. The library of claim 9 wherein the interface circuit comprises:
- a library interface circuit coupled to the second signal connector and to the media drive; and
- a host interface circuit coupled to the media drive, to the library interface circuit, and to the host signal connector.

12. The library of claim 9 wherein:
- the chassis has a power connector that is coupled to the library control circuit;
- the first signal connector has a power line coupled to the interface circuit; and
- the second signal connector has a power line coupled to the library control circuit and coupled to the power line of the first signal connector when the sled is inserted into the sled receptacle such that power is provided from the library control circuit to the interface circuit and to the media drive when the sled is inserted into the sled receptacle.

13. The library of claim 9 wherein the host signal connector includes a data line such that the interface circuit allows data communication between drive and a host computer.

14. The library of claim 9 wherein the first, second, and host signal connectors each include a respective data line such that the first, second, and host signal connectors and the interface circuit allow communication of control information between the library control circuit and a host system computer when the sled is inserted into the sled receptacle.

15. The library of claim 9, further comprising a media-drive read-write-and-control circuit mounted within the sled and coupled to the media drive and to the interface circuit.

* * * * *

UNITED STATES PATENT AND TRADEMARK OFFICE
CERTIFICATE OF CORRECTION

PATENT NO.   : 6,950,856 B2
DATED        : September 27, 2005
INVENTOR(S)  : Nathan H. Searle et al.

It is certified that error appears in the above-identified patent and that said Letters Patent is hereby corrected as shown below:

Column 14,
Line 25, insert -- the media -- between "between" and "drive".

Signed and Sealed this

Eighteenth Day of April, 2006

JON W. DUDAS
*Director of the United States Patent and Trademark Office*